United States Patent
Fisher et al.

[19]

[11] Patent Number: 5,855,354
[45] Date of Patent: Jan. 5, 1999

[54] MOTOR BRACKET WELDMENT

[75] Inventors: Lynn E. Fisher; Marc D. Pape, both of Ft. Wayne, Ind.

[73] Assignee: General Electric Company, Schenectady, N.Y.

[21] Appl. No.: 719,638

[22] Filed: Sep. 25, 1996

[51] Int. Cl.$^6$ .................................................. F16M 1/00
[52] U.S. Cl. ............................................ 248/674; 310/91
[58] Field of Search .................................. 248/674, 672, 248/671, 637; 310/89, 910

[56] References Cited

U.S. PATENT DOCUMENTS

| | | | |
|---|---|---|---|
| D. 310,816 | 9/1990 | Sawato et al. ........................ D13/112 |
| 1,556,688 | 10/1925 | Hillix . | |
| 2,151,561 | 3/1939 | Morrill ........................................ 310/91 |
| 2,598,836 | 6/1952 | Scheele ...................................... 248/671 |
| 2,662,988 | 12/1953 | McKim ....................................... 248/674 |
| 3,114,060 | 12/1963 | Goettl .......................................... 310/91 |
| 3,501,660 | 3/1970 | Wightman et al. ....................... 310/91 |
| 3,903,443 | 9/1975 | Carlson ...................................... 310/91 |
| 4,076,197 | 2/1978 | Dochterman .............................. 310/91 |
| 4,161,667 | 7/1979 | Buckman et al. ......................... 310/91 |
| 4,492,357 | 1/1985 | Morrill ...................................... 248/674 |
| 4,597,555 | 7/1986 | Weihsmann .............................. 248/672 |
| 4,636,673 | 1/1987 | McDonald ................................ 310/91 |
| 4,786,833 | 11/1988 | Knobel ....................................... 310/89 |
| 4,877,984 | 10/1989 | Colwell et al. ........................... 310/66 |
| 4,878,644 | 11/1989 | Downing ................................... 248/674 |
| 5,006,744 | 4/1991 | Archer et al. ............................. 310/89 |
| 5,015,900 | 5/1991 | Morrill ...................................... 310/91 |
| 5,184,941 | 2/1993 | King et al. ................................ 417/360 |
| 5,192,888 | 3/1993 | Fleer .......................................... 310/71 |
| 5,332,188 | 7/1994 | Davis et al. . | |
| 5,417,401 | 5/1995 | Thompson et al. ...................... 248/674 |
| 5,445,503 | 8/1995 | Kmiec et al. ............................. 417/360 |

FOREIGN PATENT DOCUMENTS

| | | | |
|---|---|---|---|
| 2 316 849 | 1/1977 | France ........................................ 310/91 |
| 816113 | 10/1951 | Germany ................................... 310/91 |
| 1104045 | 4/1961 | Germany ................................... 310/91 |
| 57-113746 | 7/1982 | Japan .......................................... 310/91 |
| 59-89542 | 5/1984 | Japan .......................................... 310/91 |

*Primary Examiner*—Leslie A. Braun
*Assistant Examiner*—Anita M. King
*Attorney, Agent, or Firm*—Barnes & Thornburg; Wayne O. Traynham; Enrique J. Mora

[57] ABSTRACT

A weldment for attaching mounting brackets and bases to electric motors includes an internal doubler element that is positioned within a motor shell and attached to the inner wall surface of the motor shell. A mounting bracket or base positioned on the outer wall surface of the motor shell is attached to the internal doubler element by a plug weld. The internal doubler element is positioned to increase the strength of the shell at critical stress areas. In addition to utilizing the internal doubler element, the mounting bracket is positioned to be aligned with and adjacent the lap weld seam of the motor shell.

60 Claims, 3 Drawing Sheets

MOTOR BRACKET WELDMENT

BACKGROUND AND SUMMARY OF THE INVENTION

The present invention relates generally to electric motors. More particularly, the present invention relates to weldment designs for attaching structures to electric motor shells.

Many arrangements have been provided in the past to mount electric motors to various support structures. Usually the shell or frame of a motor is attached to a suitable support structure by mounting lugs or arms which support the motor. Examples of different mounting arrangements can be found in U.S. Pat. Nos. 5,332,188 to Davis et al., 5,184,941 to King et al., 5,015,900 to Morrill, 4,878,644 to Downing, 4,877,984 to Colwell et al., 4,597,555 to Weihsmann, 4,492,357 to Morrill, and Des. 310,816 to Sawato et al.

The design of mounting arrangements for electric motors involves consideration of torsional forces which are encountered for a particular application. Lugs, arms, brackets, bases, etc. have to be sturdy enough to withstand foreseeable torsional forces.

One particular application which involves large torsional forces is electric motors that are used in conjunction with drive belts, chains, etc. to drive heavy machinery such as compressors. In such applications, weldments are typically used for attaching bases and other mounting brackets to the shell or frame of such "production" motors.

The weldment most commonly used in conjunction with production motors is of the projection or resistance type. However, "MIG" or arc weldments may be used for higher strength applications such as those in which significant vibration may be encountered.

In known mounting designs, the ultimate strength of weldments used for attaching bases and other mounting brackets to the shell or frame of production motors is believed to be limited by the gage or thickness of the shell or frame. When greater strength is needed, it is conventional design practice to increase the overall gage or thickness of the shell or frame.

The present invention provides a weldment design which increases the strength of the weldment without increasing the overall gage or thickness of the shell or frame of a motor. The weldment design of the present invention can be used for attaching bases and other mounting brackets to the shells or frames of electric motors. The weldment design of the present invention provides increased strength of the connection between the bases/mounting brackets and shell or frames without requiring that the overall gage or thickness of the shells or frames be increased. This is accomplished in part by providing at least one internal doubler element within a standard motor shell or frame. The internal doubler element(s) is a reinforcing plate which adds local strength to the standard shell or frame gage and thereby lowers the stress in critical stress areas adjacent an attached base or mounting bracket.

The present invention also increases weldment strength by providing for a direct weld connection between the internal doubler element(s), the shell or frame, and the base or mounting bracket. Additional weldment strength can be obtained according to the present invention by orienting the shell or frame lap weld so that an edge of the base or mounting bracket is aligned therewith.

It is accordingly one object of the present invention to provide a weldment for attaching mounting brackets and bases to electric motors.

Another object of the present invention is to provide a weldment for attaching mounting brackets and bases to electric motors which strengthens local areas subject to critical stress.

It is another object of the present invention to provide an assembly for mounting electric motors to support structures which includes external mounting structures and an internal doubler or bracing element.

It is a further object of the present invention to provide an assembly for mounting electric motors to support structures which includes external mounting structures and an internal doubler or bracing element which are welded together through a motor shell or frame.

It is a further object of the present invention to provide an electric motor having a mounting bracket or base attached thereto by a weldment.

A further object of the present invention is to provide a method of attaching a mounting bracket or base to an electric motor which utilizes a weldment.

According to these and further objects of the present invention which will become apparent as the description thereof proceeds below, the present invention provides an assembly for mounting an electric motor having a motor shell to a support which assembly includes:

a mounting bracket adjacent an outer surface of the motor shell at a first location;

an internal doubler element adjacent an inner surface of the motor shell and in alignment with the first location whereat the mounting bracket is adjacent the outer surface of the motor shell; and a connection between the mounting bracket and the internal doubler element.

The present invention further provides an electric motor which includes:

a motor shell having an inner and an outer surface;

a stator positioned in the motor shell;

a mounting bracket adjacent the outer surface of the motor shell at a first location;

an internal doubler element adjacent the inner surface of the motor shell and in alignment with the first location whereat the mounting bracket is adjacent the outer surface of the motor shell; and a connection between the mounting bracket and the internal doubler element.

The present invention also provides a method of securing a mounting bracket to an electric motor which involves:

providing an electric motor having a motor shell;

positioning an internal doubler element adjacent an inner surface of the motor shell at a first location;

positioning a mounting bracket so that a portion of the mounting bracket lies adjacent the outer surface of the motor shell at the first location and is aligned with the internal doubler element; and connecting the portion of the mounting bracket to the internal doubler element.

BRIEF DESCRIPTION OF DRAWINGS

The present invention will be described hereafter with reference to the attached drawings which are given as non-limiting examples only, in which.

DETAILED DESCRIPTION OF THE DRAWINGS

The mounting assembly of the present invention will be described herebelow with reference to the attached figures which depict a mounting bracket that is attached to an electric motor shell. It is to be noted that the present invention is not limited to use with the mounting bracket illustrated in the figures. Mounting brackets having different shapes as well as bases can be attached to electric motor shells or frames using the weldment arrangement of the present invention. Throughout the figures common reference numbers have been used for similar structures.

Figure 1:
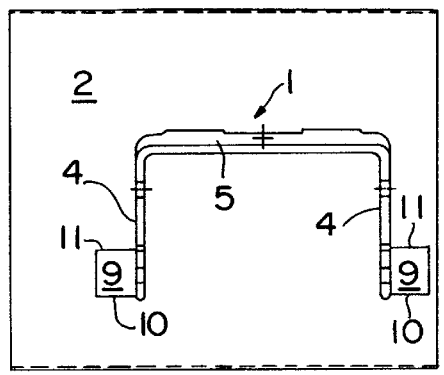
FIG. 1 is a front elevational view of a conventional motor shell having a mounting bracket attached thereto.
Figure 2:
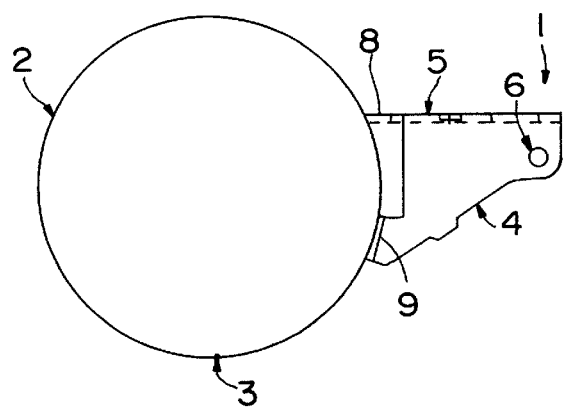
FIG. 2 is a side elevational view of the conventional motor shell of FIG. 1.
Figure 3:
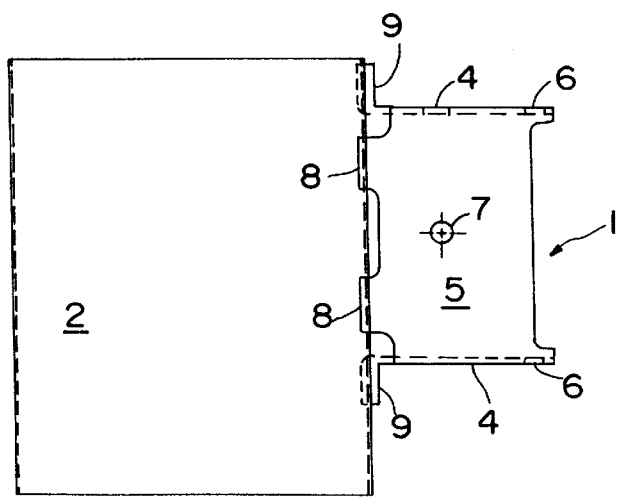
FIG. 3 is a top plan view of the conventional motor shell of FIG. 1.

FIG. 1 is a front elevational view of a conventional motor shell having a mounting bracket attached thereto. FIG. 2 is a side elevational view of the conventional motor shell of FIG. 1. FIG. 3 is a top plan view of the conventional motor shell of FIG. 1. As seen collectively from FIGS. 1–3, a mounting bracket 1 is attached along the outer wall of an electric motor shell 2 by weld portions discussed in more detail below. The motor shell 2 includes a lap weld seam 3 (FIGS. 2 and 5) which is located about 90° from the position at which the mounting bracket 1 is attached to the motor shell 2 (as seen in FIG. 2). The mounting bracket 1 includes two arm portions 4 which extend in the same direction from opposite ends of a base portion 5. In FIG. 1, the arm portions 4 are depicted as extending at substantially right angles from the base portion 5 so that the mounting bracket 1 has a generally U-shaped cross section. The arm portions 4 include through-holes 6 by which the mounting bracket 1 can be attached to a support structure in a known manner. The base portion 5 may also include one or more through-holes 7 by which to secure the mounting bracket to a support structure.

The base portion 5 includes at least two projections 8 that are planar extensions of the base portion 5. Projections 8 have edges which are in physical contact with the outer surface of the motor shell 2. The contact between the projections 8 and the outer surface of the motor shell 2 provide a weldment area for attaching the mounting bracket 1 to the motor shell 2.

A mounting pad 9 extends outwardly from the free end of each of the two arm portions 4 as shown in FIG. 1. The mounting pads 9 are aligned as depicted in FIG. 2 so as to be in substantially flat contact with the outer surface of the motor shell 2. Typically edges 10 and 11 of the mounting pads 9 are welded to the outer surface of the motor shell 2. These weldment areas in addition to the weldment areas at the contact point between projections 8 secure the mounting bracket 1 to the motor shell 2.

Figure 4:
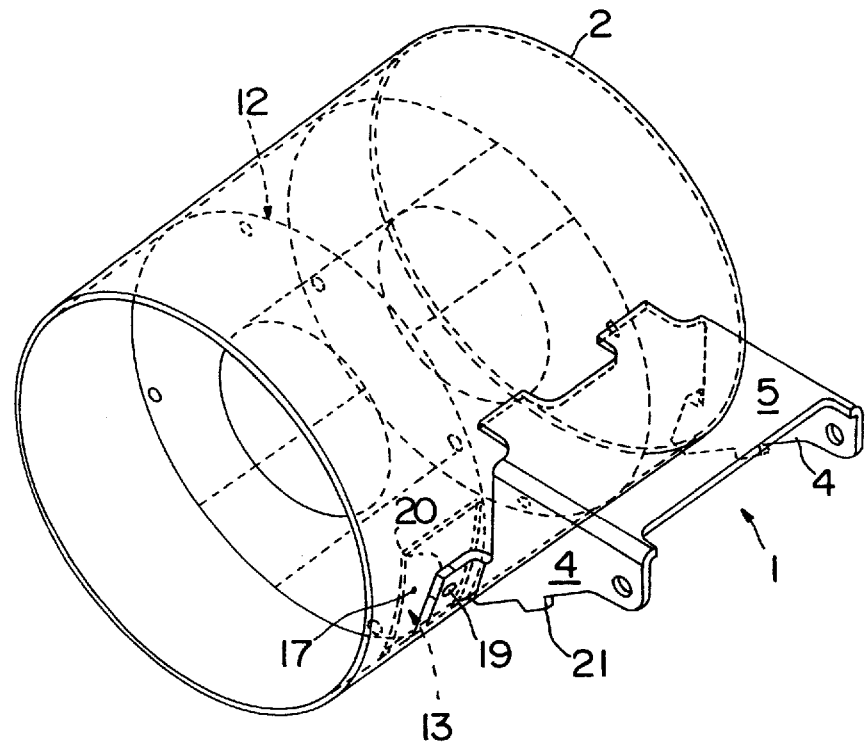
FIG. 4 is a perspective view of a motor shell having a mounting bracket attached thereto according to the present invention.

FIG. 4 is a perspective view of a motor shell having a mounting bracket attached thereto according to the present invention. As seen in FIG. 4, mounting bracket 1 is attached to an outer side wall of motor shell 2. The motor shell 2 houses a stator 12 which is depicted in phantom lines. Also depicted in FIG. 4 is an internal doubler element 13. As depicted, the internal doubler element 13 is a plate which is curved so as to conform to the inner surface of the motor shell 2. The internal doubler element 13 is positioned against the inner surface of the motor shell 2 so as to be aligned with mounting pad 9 which is positioned on the outer surface of the motor shell 2. In this arrangement, the internal doubler element 13 distributes stress applied to the motor shell 2 in critical stress areas adjacent the mounting pad 10 of the attached mounting bracket 1. In FIG. 4, the internal doubler element 13 is positioned in alignment with the mounting pad 10 which is on the end of the motor from which the motor shaft (not shown) would extend. At this end, forces pulling on the motor shaft in a direction away from the mounting bracket 1, e.g. the force of a drive belt, would cause more force to be applied to the mounting pad 10 which is aligned with the internal doubler element 13 than the mounting pad 9 at the other end of the motor.

The use of the internal doubler element 13 increases the strength of the motor shell 2 while avoiding the need to increase the overall gage or thickness of the motor shell wall.

The structure of the mounting bracket 1 is similar to that depicted in FIGS. 1–3. In this regard, the mounting bracket 1 includes a base portion 5 from which arm portions 4 extend at opposite ends. The base portion 5 includes two projections 8 which are planar extensions of the base portion 5. Projections 8 have edges which are in physical contact with the outer surface of the motor shell 2. Although two projections 8 are depicted in the figures, one, or more than two, projections could be used.

Figure 5:
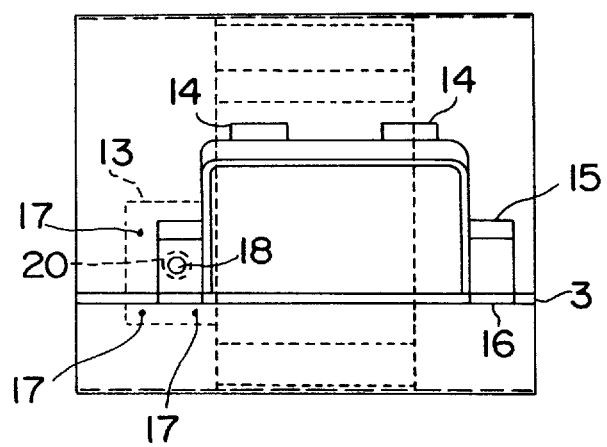
FIG. 5 is a front elevational view of the motor shell and mounting bracket of FIG. 4.

Arm portions 4 extend in the same direction from opposite ends of a base portion 5. In FIG. 5, the arm portions 4 are depicted as extending at substantially right angles from the base portion 5 so that the base of mounting bracket 1 has a generally U-shaped cross section. The arm portions 4 include through-holes 6 by which the mounting bracket can be attached to a support structure in a known manner. The base portion 5 may also include one or more through-holes (not shown) by which to secure the mounting bracket 1 to a support structure.

Figure 6:
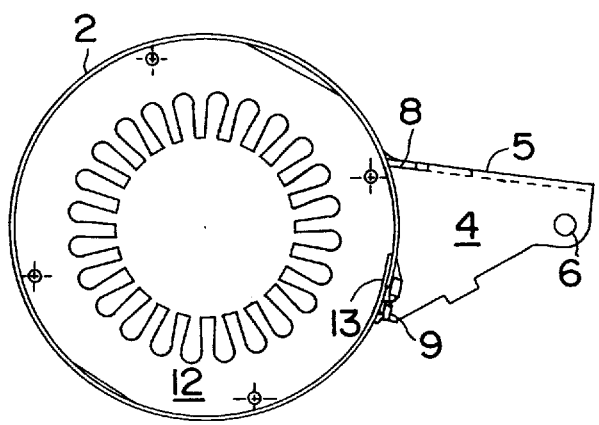
FIG. 6 is a side elevational view of the motor shell and mounting bracket of FIG. 4.
Figure 7:
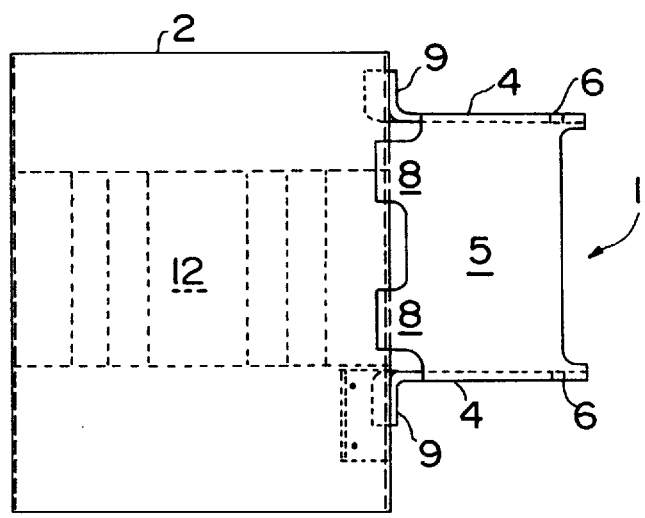
FIG. 7 is a top plan view of the motor shell and mounting bracket of FIG. 4.

A mounting pad 9 extends outwardly from the free end of each of the two arm portions 4 as shown in FIG. 4. The mounting pads 9 are aligned as depicted in FIGS. 4 and 6 so as to be in substantially flat contact with the outer surface of the motor shell 2. FIGS. 4–7 depict the arm portions 4 as being substantially perpendicular to the base portion 5 of the mounting bracket 1 and mounting pads 9 as being substantially perpendicular to the arm portions 4. This alignment of the parts has been determined to distribute stress throughout the assembly. The present invention is not limited to having the base portion 5, arm portions 4 and mounting pads 9 substantially perpendicular to one another as depicted. That is, the angles between these elements can be varied. However, any arrangement should provide physical contact between the projections 8 and the motor shell and ensure that the mounting pads 9 are substantially flat against the outer surface of the motor shell 2. The mounting pads 9 may be curved if desired to conform to the contour of the cylindrical motor shell 2.

FIGS. 5 and 6 show the various weld areas which are used to attach the mounting bracket 1 to the motor shell 2. As shown, each of the distal edges of the projections 8 are welded to the outer surface of the motor shell 2 by weld lines 14. In addition, opposite free edges 10 and 11 of each mounting pad 9 are welded to the outer surface of the motor shell 2 by weld lines 15 and 16.

As shown in FIGS. 4 and 5, the internal doubler element 13 is spot welded to the inner surface of the motor shell 2. Four spot welds 17 are illustrated as being positioned away from the center of the internal doubler element 13. The mounting pads 9, motor shell 2 and internal doubler element 13 are welded together by means of a plug weld 18. For this purpose, a through-hole 19 is centrally provided in one of the mounting pads 9, and a slightly larger diameter through-hole 20 is provided in motor shell 2. The through-holes in mounting pad 9 and motor shell 2 are aligned as depicted in FIGS. 4 and 5. In other embodiments of the present invention the plug weld 18 could be replaced with a mechanical connector, e.g. a rivet.

The mounting bracket 1 is positioned on motor shell 2 so that the edges of the mounting pads 9 are adjacent one side of the lap weld seam 3 as depicted in FIG. 5. This position takes advantage of the strength imparted to the motor shell 2 along the lap weld seam 3 which extends generally longitudinally along the motor shell. The internal doubler element 13 may extend across weld seam 3 as depicted.

The mounting bracket 1 and internal doubler element 13 shown in FIGS. 4–7 are made of a weldable metal such as steel and are designed to pivotally mount an electric motor by inserting a bolt through through-holes 6 and corresponding through-holes on a support structure. Legs 21 along the edge of arm portions 9 act, as stops to limit the degree to which the mounted motor can pivot.

It is possible to utilize separate internal doubler elements aligned with each of the mounting pads in the embodiment of the invention shown in FIGS. 4–7.

The use of the internal doubler elements can also be used in connection with conventional motor bases, including saddle or cradle type bases, and other brackets used to support or mount a motor shell or frame, including single and multiple element brackets.

The internal doubler element(s) can comprise rectangular plates as depicted in FIGS. 4–7, or be of any convenient shape. It is considered within the scope of the present to provide the internal doubler element (s) as a cylindrical element(s) which contacts the entire inner circumference of the cylindrical motor shell. Alternatively, a single rectangular internal doubler element could extend axially along the inner surface of the motor shell, provided that the stator be appropriately notched to cooperate with such an internal doubler element.

The weldment assembly of the present invention which is shown in FIGS. 4–7 can be fabricated by aligning and spot welding the internal doubler element 13 to the inner surface of the motor shell 2. Next, with or without the internal elements of the electric motor being inserted into the motor shell 2, the mounting bracket 1 is positioned in alignment with the internal doubler element 13 and the lap weld 3 of the motor shell 2. With the mounting bracket 1 held in position, the contact areas between the projections 8 and the motor shell 2 and the opposed free edges 10 and 11 of the mounting pads 9 and the motor shell 2 are welded. In addition, a plug weld 18 is provided in aligned through-holes 19 and 20. This weldment arrangement secures the mounting bracket 1 to the motor shell 2 in a manner which increases resistance to stress without having to increase the thickness of the shell or frame.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed:

1. An assembly for mounting an electric motor to a support comprising:
    a motor shell for housing an electric motor, the motor shell having a longitudinal center;
    a mounting bracket adjacent an outer surface of the motor shell at a first location;
    an internal doubler element adjacent an inner surface of the motor shell, located on one side of the longitudinal center thereof and in alignment with an end portion of the mounting bracket adjacent the outer surface of the motor shell; and
    a connection between the mounting bracket and the internal doubler element, whereby the internal doubler element reinforces the motor shell at local areas which are subject to stress.

2. The assembly for mounting an electric motor to a support according to claim 1, wherein the connection between the mounting bracket and the internal doubler element is a plug weld.

3. The assembly for mounting an electric motor to a support according to claim 1, wherein the mounting bracket includes a base portion, two arm portions which extend in substantially the same direction from opposite ends of the base portion, and a mounting pad on a free end of each of the two arm portions, and wherein one of the mounting pads is adjacent the outer surface of the motor shell at the first location and another mounting pad is adjacent the outer surface of the motor shell at another location.

4. The assembly for mounting an electric motor to a support according to claim 3, wherein each mounting pad is welded to the outer surface of the motor shell and one of the mounting pads is also plug welded to the internal doubler element.

5. The assembly for mounting an electric motor to a support according to claim 4, wherein the base portion of the mounting bracket includes at least one projection adjacent the outer surface of the motor shell which is welded thereto.

6. The assembly for mounting an electric motor to a support according to claim 5, wherein the at least one projection comprises two projections.

7. The assembly for mounting an electric motor to a support according to claim 3, wherein the motor shell includes a lap weld seam and the mounting pads of the mounting bracket are aligned with and adjacent to the lap weld seam.

8. The assembly for mounting an electric motor to a support according to claim 7, wherein the internal doubler element extends across the lap weld seam.

9. The assembly for mounting an electric motor to a support according to claim 1, wherein the motor shell includes a lap weld seam and the mounting bracket is aligned with and adjacent to the lap weld seam.

10. The assembly for mounting an electric motor to a support according to claim 1, wherein the mounting bracket comprises a base for the electric motor.

11. An electric motor which comprises:
    a motor shell having an inner and an outer surface and a longitudinal center;
    a stator positioned in the motor shell;
    a mounting bracket positioned adjacent the outer surface of the motor shell at a first, location;
    an internal doubler element positioned adjacent the inner surface of the motor shell, located on one side of the longitudinal center thereof and in alignment with an end portion of the mounting bracket adjacent the outer surface of the motor shell; and a connection between the mounting bracket and the internal doubler element whereby the internal doubler element reinforces the motor shell at local areas which are subject to stress.

12. The electric motor according to claim 11, wherein the connection between the mounting bracket and the internal doubler element is a plug weld.

13. The electric motor according to claim 11, wherein the mounting bracket includes a base portion, two arm portions which extend in substantially the same direction from opposite ends of the base portion, and a mounting pad on a free end of each of the two arm portions, and wherein one of the mounting pads is adjacent the outer surface of the motor shell at the first location and another mounting pad is adjacent the outer surface of the motor shell at another location.

14. The electric motor according to claim 13, wherein each mounting pad is welded to the outer surface of the motor shell and one of the mounting pads is also plug welded to the internal doubler element.

15. The electric motor according to claim 14, wherein the base portion of the mounting bracket includes at least one projection which is adjacent the outer surface of the motor shell and is welded thereto.

16. The electric motor according to claim 15, wherein said at least one projection comprises two projections.

17. The electric motor according to claim 13, wherein the motor shell includes a lap weld seam and the mounting pads of the mounting bracket are aligned with and adjacent to the lap weld seam.

18. The electric motor according to claim 17, wherein the internal doubler element extends across the lap weld seam.

19. The electric motor according to claim 11, wherein the motor shell includes a lap weld seam and the mounting bracket is aligned with and adjacent the lap weld seam.

20. The electric motor according to claim 11, wherein the mounting bracket comprises a base for the electric motor.

21. A method of securing a mounting bracket to an electric motor, which comprises the steps of:

providing an electric motor having a motor shell, the motor shell having a longitudinal center;

positioning an internal doubler element adjacent an inner surface of the motor shell at a first location in which the internal doubler element is located on one side of the longitudinal center;

positioning a mounting bracket so that a portion of the mounting bracket lies adjacent the outer surface of the motor shell at the first location so as to be aligned with the internal doubler element; and connecting the portion of the mounting bracket to the internal doubler element, whereby the internal doubler element reinforces the motor shell at local areas which are subject to stress.

22. The method of securing a mounting bracket to an electric motor according to claim 21, wherein the step of positioning the internal doubler element adjacent the inner surface of the motor shell comprises spot welding the internal doubler element to the inner surface of the motor shell.

23. The method of securing a mounting bracket to an electric motor according to claim 21, wherein the step of connecting the portion of the mounting bracket to the internal doubler element comprises plug welding the portion of the mounting bracket to the internal doubler element.

24. The method of securing a mounting bracket to an electric motor according to claim 21, further comprising:

providing the mounting bracket with a base portion, two arm portions which extend in the same direction from opposite ends of the base portion, and a mounting pad on a free end of each of the two arm portions, and positioning the mounting bracket so that one of the mounting pads is adjacent the outer surface of the motor shell at the first location and another mounting pad is adjacent the outer surface of the motor shell at another location.

25. The method of securing a mounting bracket to an electric motor according to claim 24 further comprising welding each mounting pad to the outer surface of the motor shell and plug welding one of the mounting pads to the internal doubler element.

26. The method of securing a mounting bracket to an electric motor according to claim 25, further comprising providing the base portion of the mounting bracket with at least one projection which is adjacent the outer surface of the motor shell, and welding the at least one projection to the outer surface of the motor shell.

27. The method of securing a mounting bracket to an electric motor according to claim 26, wherein the at least one projection comprises two projections.

28. The method of securing a mounting bracket to an electric motor according to claim 24, further comprising:

providing the motor shell with a lap weld seam, and aligning the mounting pads of the mounting bracket with and adjacent to the lap weld seam.

29. The method of securing a mounting bracket to an electric motor according to claim 28, further comprises extending the internal doubler element across the lap weld seam.

30. The method of securing a mounting bracket to an electric motor according to claim 21, further comprising:

providing the motor shell with a lap weld seam, and aligning the mounting bracket with and adjacent to the lap weld seam.

31. An assembly for mounting an electric motor comprising:

a motor shell for housing an electric motor, the motor shell including a lap weld seam;

a mounting bracket adjacent an outer surface of the motor shell at a first location adjacent the lap weld seam;

an internal doubler element adjacent an inner surface of the motor shell and in alignment with the mounting bracket adjacent the outer surface of the motor shell; and a connection between the mounting bracket and the internal doubler element, whereby the internal doubler element reinforces the motor shell at local areas which are subject to stress.

32. The assembly for mounting an electric motor to a support according to claim 31, wherein the connection between the mounting bracket and the internal doubler element is a plug weld.

33. The assembly for mounting an electric motor to a support according to claim 31, wherein the mounting bracket includes a base portion, two arm portions which extend in substantially the same direction from opposite ends of the base portion, and a mounting pad on a free end of each of the two arm portions, and wherein one of the mounting pads is adjacent the outer surface of the motor shell at the first location and another mounting pad is adjacent the outer surface of the motor shell at another location.

34. The assembly for mounting an electric motor to a support according to claim 33, wherein each mounting pad is welded to the outer surface of the motor shell and one of the mounting pads is also plug welded to the internal doubler element.

35. The assembly for mounting an electric motor to a support according to claim 34, wherein the base portion of the mounting bracket includes at least one projection adjacent the outer surface of the motor shell which is welded thereto.

36. The assembly for mounting an electric motor to a support according to claim 35, wherein the at least one projection comprises two projections.

37. The assembly for mounting an electric motor to a support according to claim 33, wherein the mounting pads of the mounting bracket are aligned with the lap weld seam.

38. The assembly for mounting an electric motor to a support according to claim 37, wherein the internal doubler element extends across the lap weld seam.

39. The assembly for mounting an electric motor to a support according to claim 31, wherein the mounting bracket is aligned with the lap weld seam.

40. The assembly for mounting an electric motor to a support according to claim 35, wherein the mounting bracket comprises a base for the electric motor.

41. An electric motor which comprises:
  a motor shell having an inner and an outer surface and a lap weld seam;
  a stator positioned in the motor shell;
  a mounting bracket positioned adjacent the outer surface of the motor shell at a first location adjacent the lap weld seam;
  an internal doubler element positioned adjacent the inner surface of the motor shell and in alignment with the mounting bracket adjacent the outer surface of the motor shell; and
  a connection between the mounting bracket and the internal doubler element, whereby the internal doubler element reinforces the motor shell at local areas which are subject to stress.

42. The electric motor according to claim 41, wherein the connection between the mounting bracket and the internal doubler element is a plug weld.

43. The electric motor according to claim 41, wherein the mounting bracket includes a base portion, two arm portions which extend in substantially the same direction from opposite ends of the base portion, and a mounting pad on a free end of each of the two arm portions, and wherein one of the mounting pads is adjacent the outer surface of the motor shell at the first location and another mounting pad is adjacent the outer surface of the motor shell at another location.

44. The electric motor according to claim 43, wherein each mounting pad is welded to the outer surface of the motor shell and one of the mounting pads is also plug welded to the internal doubler element.

45. The electric motor according to claim 44, wherein the base portion of the mounting bracket includes at least one projection which is adjacent the outer surface of the motor shell and is welded thereto.

46. The electric motor according to claim 45, wherein said at least one projection comprises two projections.

47. The electric motor according to claim 43, wherein the mounting pads of the mounting bracket are aligned the lap weld seam.

48. The electric motor according to claim 47, wherein the internal doubler element extends across the lap weld seam.

49. The electric motor according to claim 41, wherein the mounting bracket is aligned with the lap weld seam.

50. The electric motor according to claim 41, wherein the mounting bracket comprises a base for the electric motor.

51. A method of securing a mounting bracket to an electric motor, which comprises the steps of:
  providing an electric motor having a motor shell, the motor shell having a lap weld seam;
  positioning an internal doubler element adjacent an inner surface of the motor shell at a first location;
  positioning a mounting bracket so that a portion of the mounting bracket lies adjacent the outer surface of the motor shell at the first location so as to be aligned with the internal doubler element and adjacent the lap weld seam; and
  connecting the portion of the mounting bracket to the internal doubler element, whereby the internal doubler element reinforces the motor shell at local areas which are subject to stress.

52. The method of securing a mounting bracket to an electric motor according to claim 51, wherein the step of positioning the internal doubler element adjacent the inner surface of the motor shell comprises spot welding the internal doubler element to the inner surface of the motor shell.

53. The method of securing a mounting bracket to an electric motor according to claim 51, wherein the step of connecting the portion of the mounting bracket to the internal doubler element comprises plug welding the portion of the mounting bracket to the internal doubler element.

54. The method of securing a mounting bracket to an electric motor according to claim 51, further comprising:
  providing the mounting bracket with a base portion, two arm portions which extend in the same direction from opposite ends of the base portion, and a mounting pad on a free end of each of the two arm portions, and
  positioning the mounting bracket so that one of the mounting pads is adjacent the outer surface of the motor shell at the first location and another mounting pad is adjacent the outer surface of the motor shell at another location.

55. The method of securing a mounting bracket to an electric motor according to claim 54, further comprising welding each mounting pad to the outer surface of the motor shell and plug welding one of the mounting pads to the internal doubler element.

56. The method of securing a mounting bracket to an electric motor according to claim 55, further comprising providing the base portion of the mounting bracket with at least one projection which is adjacent the outer surface of the motor shell, and
  welding the at least one projection to the outer surface of the motor shell.

57. The method of securing a mounting bracket to an electric motor according to claim 56, wherein the at least one projection comprises two projections.

58. The method of securing a mounting bracket to an electric motor according to claim 54, further comprising:
  aligning the mounting pads of the mounting bracket with the lap weld seam.

59. The method of securing a mounting bracket to an electric motor according to claim 58, further comprising extending the internal doubler element across the lap weld seam.

60. The method of securing a mounting bracket to an electric motor according to claim 51, further comprising:
  aligning the mounting bracket with the lap weld seam.

* * * * *